Figure 1:
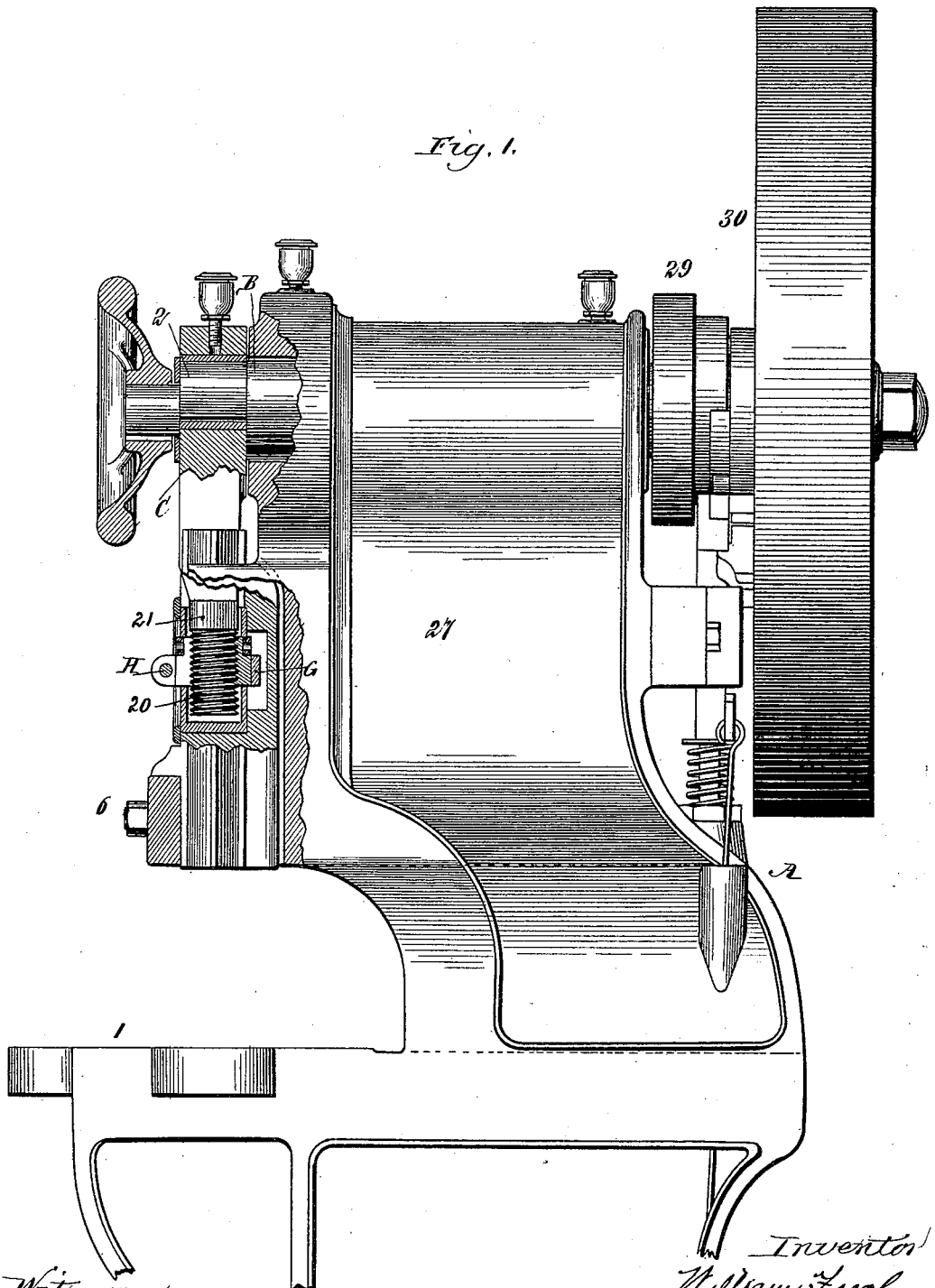

(No Model.) 2 Sheets—Sheet 1.

W. FRECH.
PUNCHING MACHINE.

No. 449,154. Patented Mar. 31, 1891.

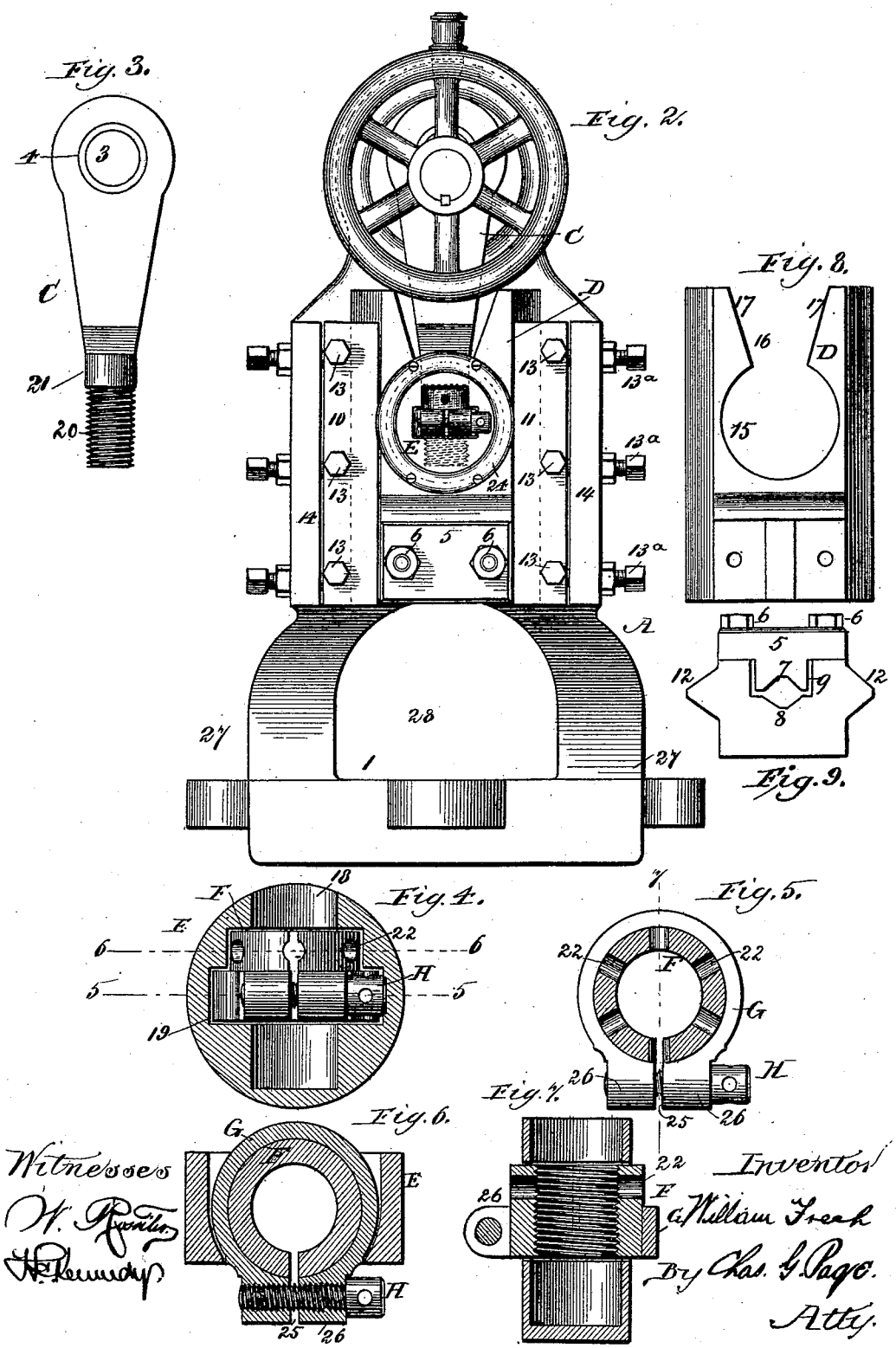

UNITED STATES PATENT OFFICE.

WILLIAM FRECH, OF CHICAGO, ILLINOIS.

PUNCHING-MACHINE.

SPECIFICATION forming part of Letters Patent No. 449,154, dated March 31, 1891.

Application filed June 12, 1890. Serial No. 355,161. (No model.)

*To all whom it may concern:*

Be it known that I, WILLIAM FRECH, a citizen of the United States, residing at Chicago, in the county of Cook, State of Illinois, have invented a certain new and useful Improvement in Punching-Machines, of which the following is a specification.

My invention relates to machines of the kind commonly termed "punching-presses," but understood to comprehend various services, such as punching, pressing, striking up, and otherwise operating upon the work in analogous ways, and for similar purposes.

The object of my invention, generally stated, is to render a machine of such character highly efficient not only in its general action, but also in its several individual actions and adjustments, and to so construct and adapt certain component parts, both with reference to individual use and service relating to one another, as to avoid the wear and tear and breakage commonly incident to the constant and heavy class of work such machines are called upon to perform, and thereby to prolong the life and utility of the machine and avoid the expense incurred by frequent repairs.

Certain other objects can be more specifically pointed out and better understood in connection with the description hereinafter made of the various parts of the machine in detail.

In a machine characterized by my invention the vertically-sliding tool-holder is connected with the pitman by an adjustable pivoted joint, so that the tool-holder can be adjusted in height with reference to the work. As a means for effecting the adjustment of such connection, I provide a nut which is carried by the tool-holder and adjustably held upon a threaded portion of or threaded part connected with the pitman, so that by turning the nut the tool-holder can be adjusted in height. The nut can be adjusted to any required extent, either great or little, and hence when so desired an infinitesimally small extent of adjustment on the part of the tool-holder can be made. To avoid wear and tear of this threaded connection, which is necessarily subject to severe concussions, I split the ring, so that it may be contracted and clamped rigidly on the pitman and also loosened or permit the nut to expand to such extent that it can be turned for the purpose of adjusting the tool-holder. As a means for providing a pivotal or swivel connection between the nut and the tool-holder, the nut is applied to a pivot block or bearing, which is pivotally applied to the tool-holder, in which way, while the pivot-block will turn in conformity with the action of the pitman, the nut can, when necessary, be turned independently of the pivot-block, so as to adjust it upon the pitman. I also arrange the fly-wheel and belt-pulley at the rear of the machine, and provide through the latter an opening extending from front to rear, so that an operator standing out of the way of the belting can with perfect safety feed the work through said opening.

Various details, all serving to increase the general efficiency of the machine, are hereinafter particularly described.

In the accompanying drawings, Figure 1 represents, partly in side elevation and partly in vertical section, a machine embodying my invention, the section being taken through the front portion of the machine on a plane parallel with the axis of the crank-shaft B. Fig. 2 represents the machine in front elevation. Fig. 3 represents the pitman. Fig. 4 represents, on a slightly larger scale, a vertical section through the pivot block or bearing E on a plane parallel with the plane of Fig. 2, the clamping device within the pivot-block being, however, shown in elevation. Fig. 5 is a horizontal section through the pivot-block and clamping device therein on line 5 5 in Fig. 4. Fig. 6 is a horizontal section taken through the pivot-block and clamping device therein on line 6 6 in Fig. 4. Fig. 7 is a vertical section taken through the pivot-block and clamping device therein on line 7 7 in Fig. 5. Fig. 8 is a front view of the tool-holder with the pivot-block removed. Fig. 9 is a bottom plan view of the tool-holder.

In said drawings, A indicates the main frame, which in practice is provided with suitably-arranged legs or supports, so as to place its bed or table portion 1 at a proper elevation for receiving the work.

The rotary crank-shaft B, to which the driving power is applied, is suitably mounted at the upper portion of the main frame and provided at one of its ends with a crank 2, from which the requisite lift and drop action of the punch or die or other tool employed may be derived.

The vertical reciprocating action of the tool-holding device is attained from the revolving action of the crank through the medium of a pitman C, which is hung upon the crank. While I may form this pitman of any suitable metal and of various constructions, I prefer that it should be a single solid piece of steel forging bored through its upper end to provide an eye 3 to receive the crank, and with such construction I prefer to provide said eye with a bushing or annular bearing 4, of gun metal or the like, it being understood, however, that for the purposes of the combinations hereinafter claimed I do not limit myself to the form and construction herein set forth as an illustration of an exceedingly practical construction of pitman.

The die or tool for operating upon the work is to be carried by a vertically-reciprocating head or slide D, which serves, therefore, as a tool-holder arranged for operation over the bed or table. As a simple and convenient means for detachably securing a tool to such slide, I provide the latter with a movable jaw or clamp 5, which is held upon the slide by screw-bolts 6. The opposing face portions of the slide and clamp are angularly recessed, as at 7 and 8, to receive and hold the shank of the tool, and to insure rigidity the clamp is adapted to fit a recess 9 in the slide, as in Fig. 9.

The slide is guided and steadied by vertically-arranged guideways upon the front of the machine, and as a desirable mode of providing such ways I arrange upon the main frame a pair of parallel guides 10 and 11, provided with suitable ways for the vertical edge portions 12 of the slide. The guide 10 is desirably arranged as a fixture or part solid with the main frame; but the guide 11 is preferably adjustable with reference to the fixed guide, in order that it can be accurately set with reference to the necessary true working of the slide. Both of these guides can be formed separately from the main frame and secured upon the latter by bolts 13 in position, respectively, alongside one and the other of a couple of abutments 14, with which the main frame is provided. With such arrangement the guide 11 can be adjusted by screws or screw-bolts 13ª, having their bearings in one of said abutments, it being understood that in such case the bolts 13 allotted to such guide can pass through short slots formed horizontally in the guide.

In order to provide a jointed or pivoted connection between the pitman and the slide, and thereby accommodate the vibratory action of the pitman due to the crank movement, I apply to the lower end of the pitman a steel or other suitable metal disk or rounded block or bearing E, which is fitted to turn within a circular recess 15 in the slide. The annular wall of this recess serves as a bearing for the block E, and hence the latter serves as an enlarged pivot upon the lower end of the pitman. The circular recess 15 is arranged somewhat below the upper end of the slide, and this way the jointed or pivoted connection between the pitman and the slide can be formed at a point between the ends of the latter, which will insure true and easy working and avoid all undue tendency on the part of the slide to bind or cramp between its guides, the true and free working of the slide being also insured by setting the block E within the slide, so that the axis of the pitman shall operate in a vertical plane parallel with and midway of the front and rear sides of the slide. The slide is also recessed from its upper end downwardly to its said circular recess, as at 16, so as to provide space to accommodate such vibratory movement as the pitman may have during operation; and in order to avoid the smallest possible gap at the point where the recess 16 merges into the recess 15, and thereby provide the latter with a desirable extent of annular bearing-surface for the block E, the side walls 17 of recess 16 may diverge upwardly and proportionally to the lateral swing of the pitman.

The block or disk E, which I may term a "pivot block" or bearing, is bored or recessed vertically, as at 18, to receive the lower end of the pitman and to permit it to have a sliding or movable connection with the same. Said pivot block or bearing is also bored or recessed horizontally, as at 19, to receive a clamp device for establishing in effect an adjustable pivotal connection between the slide and the pitman and for permitting such adjustment to be made with great accuracy and nicety. The lower end of the pitman is threaded, as at 20, and adapted to engage in a nut F, which is fitted within the pivot-block E. This nut is held centered within the recess 19 of the pivot-block by means of the pitman, which latter, as hereinbefore stated, is received within a bore 18, formed vertically in the pivot-block, so as to intersect the horizontally-arranged opening or recess wherein the nut is confined. With such arrangement the portion of said bore 18 above the nut provides a bearing for a portion 21 of the pitman just above the threaded end of the latter. The part of pitman thus fitted within the nut may be polygonal in cross-section, and the bore 18 made in conformity therewith; but I prefer to form the same cylindric and make the bore of corresponding shape.

As a means for operating the nut so as to adjust the same upon the pitman, and thereby vary the vertical adjustment of the slide or tool-holder, I provide the nut with a series of laterally-arranged recesses 22, which are desirably provided with steel bushings and adapted to receive the end of a key or lever, which can be readily inserted into any one of said openings and operated so as to turn the nut.

The steel bushings could be omitted, or in place thereof I could secure an apertured steel collar upon the nut; but I find that a more durable arrangement is provided by forming the recesses directly in the nut, and bushing the same to prevent wear. When the nut is thus operated, it turns independently of the pivot-block, and also turns upon the threaded end portion of the pitman, but being confined within the pivot-block, which is in turn confined within the slide, an adjustment of the latter is of course effected.

In order to retain the pivot-block within its allotted recess 15 in the slide, I secure to the front side of the latter an annular cap-plate 24, arranged to lap the front marginal portion of the pivot-block, by which arrangement the nut will be exposed and accessible.

In addition to its function as an adjusting-nut, said nut also possesses the additional function of a clamp, which can be so held upon the pitman as to practically render it a solid portion thereof as long as may be necessary, and to such end the nut is split or divided at one side of its threaded bore, as shown in Figs. 5 and 6, wherein the split or division in the nut is indicated at 25. By such arrangement the nut can be clamped upon the pitman, so that it will be rigid therewith, and in effect a solid portion of the same, thereby avoiding all wear and tear of the thread, while on the other hand the nut can, when so desired, be loosened to an extent to permit its adjustment upon the pitman.

As a preferred mode of clamping the nut upon the pitman, I provide it with a steel or other suitable metal clamp G, consisting of a split ring or band, which is fitted about the nut and provided at its ends with bearings for the clamp-screw H, in which way by properly operating the clamp-screw the clamp can be contracted upon the nut, so as to contract the nut upon the pitman. The width of the ring or band thus forming the clamp should be such as to leave exposed the holes or recesses 22 in the nut, and said band will be fitted to the nut, so that said nut may turn independently of the clamp when the latter is loosened thereon. By this arrangement the clamp-screw H will at all times be available, and as a matter of course some one or more of the recesses 22 in the nut will also be at all times available, no matter to what extent the nut may have been turned within the clamp.

The head of the clamp-screw can be adapted for a wrench; but I prefer to provide it with holes or sockets adapted to receive the end of the bar or lever, in which way a comparatively light bar or lever can at one end be adapted for engaging the nut, while its other end can be adapted for engaging the clamp-screw.

As a further feature of improvement, I arrange the sides or standards 27 of the machine to rise from the opposite longitudinal sides of the bed or table, so as to form over the table an opening 28, Fig. 1, which extends from front to rear of the machine, so as to form a passage-way for the feed of the work arranged over the table 1 and between the sides 27 and parallel with the shaft, which said opening extends through the machine and opens both at the front and the rear thereof. The table 1 also extends entirely through the frame and forms the bottom of said passage or opening. The crank 2 is therefore at the front of the machine, while the belt-pulley 29 and fly-wheel 30 are arranged upon the shaft at the rear end of the machine, and hence out of the way of the operator. The fly-wheel is also sufficiently elevated to avoid interference with work fed through the opening 28. By such arrangement the full length of the bed or table 1 from front to rear is utilized as an extended support for the work, which can be fed along the same by an operator, who, while standing in the most desired position for feeding the work and controlling the machine, will be out of the way of the driving-belt and fly-wheel.

What I claim as my invention is—

1. In a punching-machine, an adjustable connection between the pitman and tool-holder for the purpose set forth, a split nut carried by the tool-holder and arranged to clamp upon a threaded portion of the pitman, so that by loosening the nut it can be operated to adjust the tool-holder and by tightening it upon the pitman it can be held rigid thereon.

2. The combination, with the pitman, of the split nut adjustably applied thereto and carried by a suitable tool-holder, and a clamp applied to the nut for the purpose of contracting and loosening the same.

3. The combination, substantially as hereinbefore set forth, with the pitman and a suitable tool-holder, of the split nut applied to a threaded portion of the pitman and provided with a set of recesses which are exposed so as to permit the nut to be engaged and operated by a suitable key or lever, substantially in the manner described.

4. The combination, substantially as hereinbefore set forth, with the pitman and tool-holder, of the split nut carried by the tool-holder and the clamp G, applied to the nut for contracting and loosening the same upon the pitman and provided with bearings 26 for a clamp-screw.

5. The combination, substantially as hereinbefore set forth, with the pitman, and a suitable tool-holder, of an adjustable pivotally-arranged connecting device between the two comprising a pivot block or bearing pivotally connected with the tool-holder and provided with an adjusting-nut which is adjustably connected with the pitman.

6. The combination, substantially as hereinbefore set forth, with the pitman and a suitable tool-holder, of the recessed pivot block or bearing having a movable connection with the pitman and pivotally connected with the tool-holder, and a split nut confined within the said pivot block or bearing and applied to and adapted to clamp upon a threaded portion of the pitman.

7. The combination, with the pitman and a suitable tool-holder, of the recessed pivot block or bearing pivotally held within a bearing in the tool-holder and receiving the lower end of the pitman, and a split nut applied to and arranged to clamp upon a threaded portion of the pitman, said nut being confined within the pivot-block, but accessible at one side thereof.

8. The combination, with the pitman and tool-holder, of the pivot-block E, arranged within a circular recess in the tool-holder and having a movable connection with the pitman, the split clamp-nut confined within the pivot-block and applied to a threaded portion of the pitman, and the cap-ring 24 for holding the pivot-block within its allotted recess and at the same time exposing the nut.

9. The combination, substantially as hereinbefore set forth, with the pitman having a lower threaded end portion, of the tool-holder, the pivot-block E pivotally applied to the tool-holder, and having a vertical bore 18 to receive the pitman and a horizontally-arranged opening to receive a clamping device adjustably held on the threaded end portion of the pitman.

10. The combination, substantially as hereinbefore set forth, of the pitman C, operated by the crank-shaft, the sliding tool-holder D, a pivot-block having a movable connection with the pitman and pivotally applied to the tool-holder, and a split nut F, confined within said pivot-block and applied to a threaded portion of the pitman.

WILLIAM FRECH.

Witnesses:
  H. C. KENNEDY,
  R. REDLICK.